United States Patent
Claridge et al.

(10) Patent No.: US 8,666,841 B1
(45) Date of Patent: Mar. 4, 2014

(54) FRAUD DETECTION ENGINE AND METHOD OF USING THE SAME

(75) Inventors: Philip Geoffrey Claridge, Cambridge (GB); Alastair David Hanlon, Essex (GB); Marian Hatfield, Staffordshire (GB)

(73) Assignee: Convergys Information Management Group, Inc., Cincinnati, OH (US)

( * ) Notice: Subject to any disclaimer, the term of this patent is extended or adjusted under 35 U.S.C. 154(b) by 243 days.

(21) Appl. No.: 12/393,383

(22) Filed: Feb. 26, 2009

Related U.S. Application Data

(63) Continuation of application No. 12/248,288, filed on Oct. 9, 2008, now abandoned.

(60) Provisional application No. 60/978,553, filed on Oct. 9, 2007.

(51) Int. Cl.
*G06Q 30/00* (2012.01)

(52) U.S. Cl.
USPC ........... 705/26.35; 705/1; 705/26.1; 705/318; 705/325

(58) Field of Classification Search
USPC ....................................... 705/26.35, 318, 325
See application file for complete search history.

(56) References Cited

U.S. PATENT DOCUMENTS

| | | | |
|---|---|---|---|
| 5,854,834 A | 12/1998 | Gottlieb et al. | |
| 6,095,413 A | 8/2000 | Tetro et al. | |
| 6,122,624 A | 9/2000 | Tetro et al. | |
| 6,516,056 B1 * | 2/2003 | Justice et al. | 379/145 |
| 6,650,736 B1 | 11/2003 | Unger et al. | |
| 6,715,672 B1 | 4/2004 | Tetro et al. | |
| 6,859,524 B2 | 2/2005 | Unger et al. | |
| 7,035,384 B1 | 4/2006 | Scherer | |
| 7,096,192 B1 | 8/2006 | Pettitt | |
| 7,155,417 B1 | 12/2006 | Sagar et al. | |
| 7,263,506 B2 * | 8/2007 | Lee et al. | 705/38 |
| 2003/0069820 A1 | 4/2003 | Hillmer et al. | |
| 2004/0078340 A1 | 4/2004 | Evans | |
| 2004/0148256 A1 | 7/2004 | Bramnick et al. | |
| 2004/0177047 A1 | 9/2004 | Graves et al. | |
| 2004/0225520 A1 | 11/2004 | Aoki et al. | |
| 2005/0033702 A1 | 2/2005 | Holdsworth | |
| 2005/0160052 A1 | 7/2005 | Schneider et al. | |

(Continued)

FOREIGN PATENT DOCUMENTS

| | | |
|---|---|---|
| EP | 0 598 469 | 5/1994 |
| WO | WO 01/18755 | 3/2001 |

(Continued)

OTHER PUBLICATIONS

U.S. Appl. No. 11/276,497, filed Mar. 2, 2006, Peterson.

(Continued)

*Primary Examiner* — Bradley B. Bayat
(74) *Attorney, Agent, or Firm* — Foley & Lardner LLP

(57) ABSTRACT

A fraud detection system and method uses unique indicators for detecting fraud that extend beyond traditional transaction-based indicators. These unique indicators may include environmental information about a customer or a transaction. Such indicators may be used to identify fraud events based on computer-executable instructions that evaluate fraud risk. Further, an improved fraud detection system may include a learning component with a feedback loop. Also, authenticating and other information may be directed to the system for updating indicating data, fraud models, and risk assessments.

14 Claims, 3 Drawing Sheets

(56) References Cited

U.S. PATENT DOCUMENTS

| | | | |
|---|---|---|---|
| 2005/0185779 | A1 | 8/2005 | Toms |
| 2005/0209876 | A1 | 9/2005 | Kennis et al. |
| 2006/0064374 | A1 | 3/2006 | Helsper et al. |
| 2006/0107069 | A1 | 5/2006 | Hoffman |
| 2006/0124726 | A1 | 6/2006 | Kotovich et al. |
| 2006/0149674 | A1 | 7/2006 | Cook et al. |
| 2006/0202012 | A1 | 9/2006 | Grano et al. |
| 2006/0248019 | A1 | 11/2006 | Rajakumar |
| 2006/0285665 | A1 | 12/2006 | Wasserblat et al. |
| 2007/0038560 | A1 | 2/2007 | Ansley |
| 2007/0038867 | A1 | 2/2007 | Verbauwhede et al. |
| 2007/0084913 | A1 | 4/2007 | Weston |
| 2007/0090181 | A1 | 4/2007 | Varadarajan et al. |
| 2007/0100773 | A1* | 5/2007 | Wallach ............... 705/75 |
| 2007/0106582 | A1 | 5/2007 | Baker et al. |
| 2007/0133768 | A1 | 6/2007 | Singh |
| 2007/0174082 | A1 | 7/2007 | Singh |
| 2007/0174214 | A1 | 7/2007 | Welsh et al. |
| 2007/0198410 | A1 | 8/2007 | Labgold et al. |
| 2007/0203826 | A1 | 8/2007 | Russell et al. |
| 2007/0208662 | A1 | 9/2007 | Jeronimus et al. |
| 2007/0226095 | A1 | 9/2007 | Petriuc |
| 2007/0233614 | A1 | 10/2007 | McNelley et al. |
| 2008/0103798 | A1* | 5/2008 | Domenikos et al. ............... 705/1 |
| 2008/0103799 | A1* | 5/2008 | Domenikos et al. ............... 705/1 |
| 2008/0103800 | A1* | 5/2008 | Domenikos et al. ............... 705/1 |
| 2008/0120195 | A1* | 5/2008 | Shakkarwar ................. 705/26 |
| 2008/0288303 | A1* | 11/2008 | Gray et al. .................... 705/7 |

FOREIGN PATENT DOCUMENTS

| | | |
|---|---|---|
| WO | WO 02/37219 | 5/2002 |
| WO | WO 03/079258 | 9/2003 |
| WO | WO 2004/003676 | 1/2004 |
| WO | WO 2005/043428 | 5/2005 |
| WO | WO 2006/126183 | 11/2006 |
| WO | WO 2007/004224 | 1/2007 |

OTHER PUBLICATIONS

U.S. Appl. No. 11/686,812, filed Mar. 15, 2007, Irwin et al.
U.S. Appl. No. 11/696,405, filed Apr. 4, 2007, Scherer.
Abbott, D.W. et al., "An Evaluation of High-End Data Mining Tools for Fraud Detection," Systems, Man, and Cybernetics, vol. 3 (Oct. 1998) pp. 2836-2841.
Allan, A. et al., "State of the Art for Online Consumer Authentication," Gartner Research (May 5, 2006). pp. 1-18.
Bignell, K.B., "Authentication in an Internet Banking Environment; Towards Developing a Strategy for Fraud Detection," Internet Surveillance and Protection (2006) pp. 1-8.
Chan, P.K. et al. "Distributed Data Mining in Credit Card Fraud Detection," IEEE Intelligent Systems (Nov./Dec. 1999) pp. 67-74.
Dorronsoro, J.R. et al., "Neural Fraud Detection in Credit Card Operations," Neural Networks, vol. 8(4) (Jul. 1997) pp. 827-834.
Fawcett, T. et al., "Adaptive Fraud Detection," Data Mining and Knowledge Discovery, Swinger Netherlands, vol. 1(3) (Sep. 1997) pp. 1-29.
"Halting the Rise in Debit Card Fraud Losses," Fair Isaac Corporation (Jul. 2004) pp. 1-11.
Kou, Y. et al., "Survey of Fraud Detection Techniques," Networking, Sensing and Control, vol. 2 (2004) pp. 749-754.
Liu, Y. et al., "A Rough Set and Evidence Theory Based Method for Fraud Detection," Intelligent Control and Automation, vol. 1 (2006) Abstract.
Litan, A., "Authentify's Out-of-Band Authentication Gains Traction in Niche Apylications," Gartner Research (Nov. 30, 2005) pp. 1-7.
Litan, A., "Bank of America's SiteKey Fosters Confidence, but Issues Remain," Gartner Research (Sep. 29, 2006) pp. 1-7.
Litan, A., "Complementary Security Methods Reduce Fraud and Strengthen Authentication" Gartner Research (Oct. 2005) pp. 1-6.
"Method and Service which Automatically Updates a Charge or Debit Card Acceptable Usage Physical Location," IBM (Apr. 12, 2007) IP.com Prior Art Database.
Quah, J.T.S. et al., "Real Time Credit Card Fraud Detection using Computational Intelligence," Proc. of International Joint Conference on Neural Networks (Aug. 2007) pp. 863-868.
"RSA Adaptive Authentication," RSA, the Security Division of EMC; http://www.rsa.com/node.aspx?id=3018 (Nov. 2, 2007) pp. 1-3 and (Nov. 11, 2008) pp. 1-5.
Taniguchi, M. et al., "Fraud Detection in Communication Networks using Neural and Probabilistic Methods," Acoustics, Speech, and Signal Processing, vol. 2 (May 1998) pp. 1241-1244.
Yeswanth K.P. et al., "Integration of Smart Card and Gabor Filter Method Based Fingerprint Matching for Faster Verification," INDICON (Dec. 2005) pp. 526-529.

* cited by examiner

FRAUD DETECTION ENGINE AND METHOD OF USING THE SAME

PRIORITY

This application is a continuation of, and claims priority to, U.S. Nonprovisional application Ser. No. 12/248,288, having the same title and filed on Oct. 9, 2008. This application further claims priority from the disclosure of U.S. Provisional Patent Application Ser. No. 60/978,553, Enhanced Fraud Detection Engine and Method of Using the Same, filed on Oct. 9, 2007, which is incorporated by reference herein.

BACKGROUND

In numerous service industries today, fraud detection plays an important and prominent role. By way of example, and not limitation, industries that use fraud detection systems as an important component of their businesses include financial service industries, e-commerce retailers, and telecommunication industries.

The role of fraud detection is critical today because of high monetary losses associated with fraud. For example, for the 2006 calendar year, it is estimated that in the U.S. and Canada, over $3 billion dollars in revenue was lost in e-commerce payment transactions due to fraud. While this figure alone is significant, it represents only a fraction of the total fraud annual losses. Revenue losses from fraud are occurring despite companies using several fraud detection tools that aim to protect companies and customers from various forms of fraud. Examples of some common fraud detection tools include address verification services (AVS) and card verification numbers (CVN).

What adds to the cost of fraud further is the current efficiency of fraud detection. In e-commerce payment transactions, it is estimated that companies reject nearly 4 otherwise valid transactions for each fraudulent transaction rejected. This creates a backlash of customer dissatisfaction for each otherwise valid transaction that is rejected. Also, despite automation advances in fraud detection systems, the majority of companies use some level of manual review, which further adds to the cost of combating fraud.

In operation, current automated fraud detection systems function by identifying possible fraud events. To identify fraud events, automated fraud detection systems collect and analyze transaction information and other indicating data to identify certain patterns of behavior and/or characteristics that have been associated with fraud. These patterns and/or characteristics may be used to create fraud models. When a transaction is evaluated against a fraud model, and the model provides a statistical indication that the transaction may be fraudulent, the transaction can be marked as potentially fraudulent. Once a possible fraud event is identified, the associated transaction or request is either accepted, rejected, sent to manual review, or assigned for further automated review. The determination of how a particular fraud event or a class of fraud events is handled is based upon rules established in an automated screening system.

Despite current fraud detection systems, one limitation of such systems is their emphasis on traditional transaction details when detecting fraud. Traditional indicators may include such things as per card transaction information, recent transaction history, verification errors, device identification, and common customer care requests. To provide further detail of such traditional indicators, examples of per card transaction information may include: transaction value, type of goods purchased, transaction channel of purchase (point-of-sale or internet), physical presence or absence of a customer's card at purchase (card swipe, card chip, or manually entering card number), and transaction country. Examples of verification errors may include: failed personal identification number (PIN) on an automatic teller machine (ATM), and failed PIN on a chip-and-pin point-of-sale (POS) terminal. Examples of device identification indicators may include IP address tracking. For instance, where a customer's account shows access to self-care via an internet device with a given IP address, later access by an alternate IP address, or use of the same IP address for accessing multiple user accounts, may suggest fraud. Examples of common customer care requests may include: address change requests, statement requests, credit limit increase requests, balance inquiries, additional card requests, and account open or close requests.

Another challenge in the market for fraud detection systems is the dynamic nature of fraud. Those who commit fraudulent activities continue to invent new ways to circumvent fraud detection systems. Hence, in some instances, an initially effective fraud model can become ineffective without frequent updates to the underlying aspects of that model.

Based on the statistics for fraud losses and the cost of combating fraud, a substantial need exists to improve the detection of fraud events. Furthermore, it is desirable that such improvements include reducing the number of incorrectly identified fraudulent events and/or reducing the cost to identify fraud events. Certain embodiments described below are designed to provide a solution to certain weaknesses in fraud detection technology as set forth above.

SUMMARY

Embodiments described below relate to an improved fraud detection system and method. As one feature, the fraud detection system and method may incorporate one or more unique indicators based on a customer's environmental information. Such indicators may be incorporated either individually or in combination. These indicators may further include aspects from customer care systems, including self-care systems (SCSs), assisted care systems (ACSs), or systems combining SCSs and ACSs. As described in further detail below, some embodiments may incorporate one or more indicators based on: (1) the customer's access channels used for customer care operations in the past compared to the present; (2) the time patterns a customer has accessed customer care operations in the past compared the present; (3) the location originating information from which customer care operations were made; (4) biometric information; (5) an input indicating the level of suspicion an agent assigns to a given transaction and/or request; (6) a location association related to a customer care operation; and (7) a customer's travel schedule. It should be appreciated that this listing of potential indicators is not all-inclusive. Additional indicators or more specific indicators discussed below may be included as well as obvious variants to those of ordinary skill in the art.

Embodiments may use risk assessment and decisionmaking software to evaluate potential fraud events and determine further action. The further action triggered by the fraud detection system may include allowing the transaction, blocking the transaction, referring the transaction for agent review, or collecting additional information (automatically or manually) to determine the validity of the transaction.

Embodiments may include an authentication system that may incorporate one or more of the above indicators as part of an authentication step in the fraud detection process. Therefore, the indicators may be used as a means to further verify a transaction or a user's action before declaring a transaction fraudulent.

Embodiments may automatically identify a fraud event and then generate an assertion which may be communicated to a customer by automated means. The customer may then respond to the communication and provide information which may verify that the fraud event is either truly fraud or not fraud. The fraud system may then be automatically updated for the particular customer's account so that the fraud detection system becomes more sensitive to fraud detection for that customer without the need for manual review or updating.

Embodiments may be integrated with a computer system that provides a learning engine with an automated feedback system for improved fraud detection. An example of such a feedback loop can be seen in U.S. Ser. No. 11/276,497, entitled System and Method for Closed Loop Decisionmaking in an Automated Care System, filed Mar. 2, 2006, the disclosure of which is incorporated herein by reference. The computer system includes computer-readable medium and computer-executable instructions that allow a risk assessment for fraud to be conducted. The computer-executable instructions may incorporate artificial intelligence technology to conduct such risk assessments. Also, communication channels may be integrated with the fraud system that allow the system to communicate with a fraud specialist or customer. The fraud detection system's learning engine allows the fraud detection system to automatically update the fraud models based on information that may be received through any available channel of communication between the fraud detection system and another person, system, or entity.

Embodiments may comprise a method for detecting fraud events including the steps of: (1) identifying customer care operations that deviate from a normal pattern for a given customer's account; (2) creating an assertion which may suggest a reason for the possible shift from a normal pattern; (3) identifying a customer's preferred contact methods—this may include accessing databases or systems that capture such information; (4) notifying the customer through one of the preferred contact methods—this may be through a manually or automatically initiated communication; (5) informing the customer of the possible fraudulent activity; (6) sharing the assertion with the customer; (7) acquiring the customer's response to the assertion; and (8) modifying the programming in the fraud detection systems to more accurately identify fraud based on the provided information. It should be appreciated that method steps of the embodiments may be performed automatically—thus without the need for manual oversight or input from those other than the customer. It should also be appreciated that in addition to, or as an alternative to, contacting the customer directly, a fraud specialist may be notified and presented with the suggestion of fraud. The fraud specialist may then make an evaluation and provide a response to the system. The information provided by the fraud specialist may then be used to modify the fraud detection system.

For the purpose of clarity, certain terms used in this disclosure, including the various forms of those terms, should be understood to have certain meanings.

The term "environmental information" should be understood broadly to refer to that information derived from the circumstances or conditions that surround someone or something.

The term "self-care systems" should be understood to refer to any computerized system which allows a customer interaction, such as the reporting of a problem with an existing service, to be performed in an automated manner.

The term "assisted care systems" should be understood to refer to systems that allow customers to interact, at least in part, directly with human agents.

The term "stealth information" should be understood to refer to information that may be obtained in a manner that is not openly acknowledged. Stealth information may often include information obtained from or about a customer when the customer is unaware the information is being collected. For example, certain biometric information, such as voice analysis of a telephone call from a customer to a call-center, may qualify as stealth information that may be used to determine if a fraudulent transaction being attempted. Additionally, an agent's suspicion of a caller, based on the circumstances of the call, could serve as a form of stealth information. It should be understood that the disclosure here does not intend to limit stealth information to only that information collected when a customer is unaware the information is being collected. For example, stealth information may include biometric information, such as voice analysis, even when customers know they are providing voice samples. Additionally, stealth information could include linking to third party databases to determine other information about a user. For example, if a spouse calls on a joint checking account and a search is done which reveals that the couple was recently divorced, then the transaction might not be legitimate. Similarly, if a flight database is accessed to determine if a given customer checked-in on a flight to France, a later transaction in France may be legitimate.

The term "point-of-sale terminal" or "POS terminals" should be understood to refer to any location where a transaction is made in person rather than over the telephone or internet. This definition should be read broadly and includes ATM locations, retail shop locations, service business locations, among many others. Moreover, transactions at POS terminals may be made by card swipes, card chip-and-pin technology, or other similar technologies.

The term "fraud detection system" should be understood to refer to any process that uses a computer-readable medium and computer-executable instructions to identify potential fraudulent action taken on behalf of a customer's account. Fraud detection systems should further be understood to refer to any system for identifying fraud. Fraud detection systems of this disclosure may also include processes that receive input from human agents. This input may be used to identify potential fraudulent action taken on behalf of a customer's account.

The term "indicators" should be understood to refer to any customer or transaction information which may be used to characterize action taken on behalf of a customer's account. Indicators may be represented in the computing context as pieces of data or variables stored in one or more computer-readable data storages. By way of example only, and not limitation, an indicator related to the type of access channel used to access customer care may be represented as a data count of the number of times a customer has accessed a particular channel.

The term "fraud event" should be understood to refer to any action taken on behalf of the customer's account that the customer did not intend, or that was in error. In the computing context, an "event" is any identifiable occurrence that has significance for system hardware or software. User-generated events may include keystrokes and mouse clicks, among a wide variety of other possibilities. System-generated events may include program loading and errors, among a wide variety of other possibilities. An event typically represents some message, token, count, pattern, value, or marker that can be recognized within an ongoing stream of monitored inputs, such as network traffic, specific error conditions or signals, thresholds crossed, counts accumulated, and so on.

The term "computer-readable medium" should be understood to refer to any device or medium, or combination of devices and media, which is capable of storing computer-readable and/or executable instructions and/or data.

The term "computer-executable instructions" should be understood to refer to any combination of one or more computer instructions regardless of how organized, whether into one or more modules, one or more programs, a distributed system or any other organization.

The term "risk assessment" should be understood to refer to any processing or decision step used to determine the likelihood of a particular occurrence.

The term "artificial intelligence" should be understood to refer to the simulation of human intelligence processes by machines, especially computer systems. These processes include learning (the acquisition of information and rules for using the information), reasoning (using the rules to reach approximate or definite conclusions), and self-correction. These process may be contained in various computer programs.

The term "communication channel" should be understood to refer to any mechanism that allows two entities to exchange information. A communication channel may be used between people (e.g. telephone or email), between things (e.g. components of a computer system exchanging information), between people and things (e.g. people exchanging information with a computer system) and/or combinations of the foregoing.

The term "learning engine" should be understood to refer to any process where feedback is received and, as a result, may be used to automatically update other processes, models, programs, or executable instructions.

The term "fraud models" should be understood to refer to any reference, against which a user's activities are compared, to determine if the activities might be fraudulent. A model in the computing context should be understood to include a combination of data structures and logic. The logic may include rules that provide for a result when conditions are met. By way of example, and not limitation, a fraud model may reference a data structure that contains data with the average amount for charges a customer incurs in a month, as well as data with the actual running monthly totals for charges incurred. A logic associated with the fraud model may include a rule to the effect that, "if the running charges for a given month exceed the average by 20%, then notify the customer of potential unauthorized purchases."

The term "fraud patterns" should be understood to refer to any action or attribute, or combination of actions or attributes, that form a consistent or characteristic arrangement indicative of fraud.

The term "assertion" should be understood to refer to a user-defined message. The user-defined message may be merely informative, may provide a rationale for an event identified as likely fraudulent, and/or may request further information or confirmation from an authorized user of a customer account. Representations for assertions may include, but not be limited to, sequences of characters and numbers in a database, and/or data files containing audio or video. The assertion may be associated with a triggered fraud alert such that a computer logic would include a rule that defines which assertion is triggered with which fraud alerts.

The term "response," in the context of an authorized user or customer responding to an assertion, should be understood to refer to any information which may be represented in a computing environment as a piece of data or a variable that may be further organized in a data structure and may be used by a computer program. By way of example, and not limitation, where a response is received by a customer calling into an IVR, the response may be represented by touch-tone buttons pressed by the customer in responding to menu options presented in the IVR.

The term "customer care operations" (also referred to as "customer care requests") should be understood to refer to any systems used to make transactions or changes to a customer's account, whether by a live agent or a computer-supported interface. It should be understood that the disclosure here applies to transactions as well as customer care requests or operations.

The term "access channels" should be understood to refer to any mode by which an entity has the ability, right, or permission to approach, enter, communicate with, or use the thing accessed.

The term "entity" should be understood to refer to any person, organization, object, process, or system.

The term "time patterns" should be understood to refer to any classifiable characteristic related to time. For example, a time pattern may represent either a frequency of customer care operations or duration of customer care operations. Additionally, time patterns may include time of day, time of week, time of month, or time of year the customer has accessed customer care operations.

The term "location originating information" should be understood to refer to any information related to the country, state, city, province, GPS coordinates, or any other geographical marker, from which the customer care operation occurred.

The term "biometric information" should be understood to refer to any voice identification information, voice stress analysis information, or any other information that can be linked to a person's biological characteristics and observed during any form of interaction.

The term "location association" should be understood to refer to any comparison of one or more locations. Location association may compare the location of the customer's home residence with the location of a transaction. Additionally, location association may compare the location of the transaction with the location of the customer's mobile telephone or other mobile device. Location association is not meant to be limiting and may encompass any comparable locations that may help validate the credibility of a customer care operation taken or contemplated on behalf of a customer's account.

The term "authenticating information" should be understood to refer to any information that tends to prove or serve to prove that something is genuine or authentic. For example, authenticating information may include information that would tend to confirm a customer care operation was not fraudulent.

The term "additional information" should be understood to refer to any information that is otherwise not authenticating information. Additional information may include information that would tend to confirm a customer care operation was fraudulent. Additional information may also include information that would provide details concerning a transaction in question, another past transaction, a future transaction, or a customer's behavior. Information related to a customer's behavior may include a customer's location, travel plans, transaction plans, or any other information related to the behavior of a customer.

DETAILED DESCRIPTION

All embodiments described herein are intended to be illustrative and, therefore, non-limiting. Several embodiments below describe various indicators that may be used to detect fraudulent transactions or requests. Further, a system and method is described, which may use the various fraud indicator embodiments discussed among others.

A. Fraud Indicators

Figure 1:
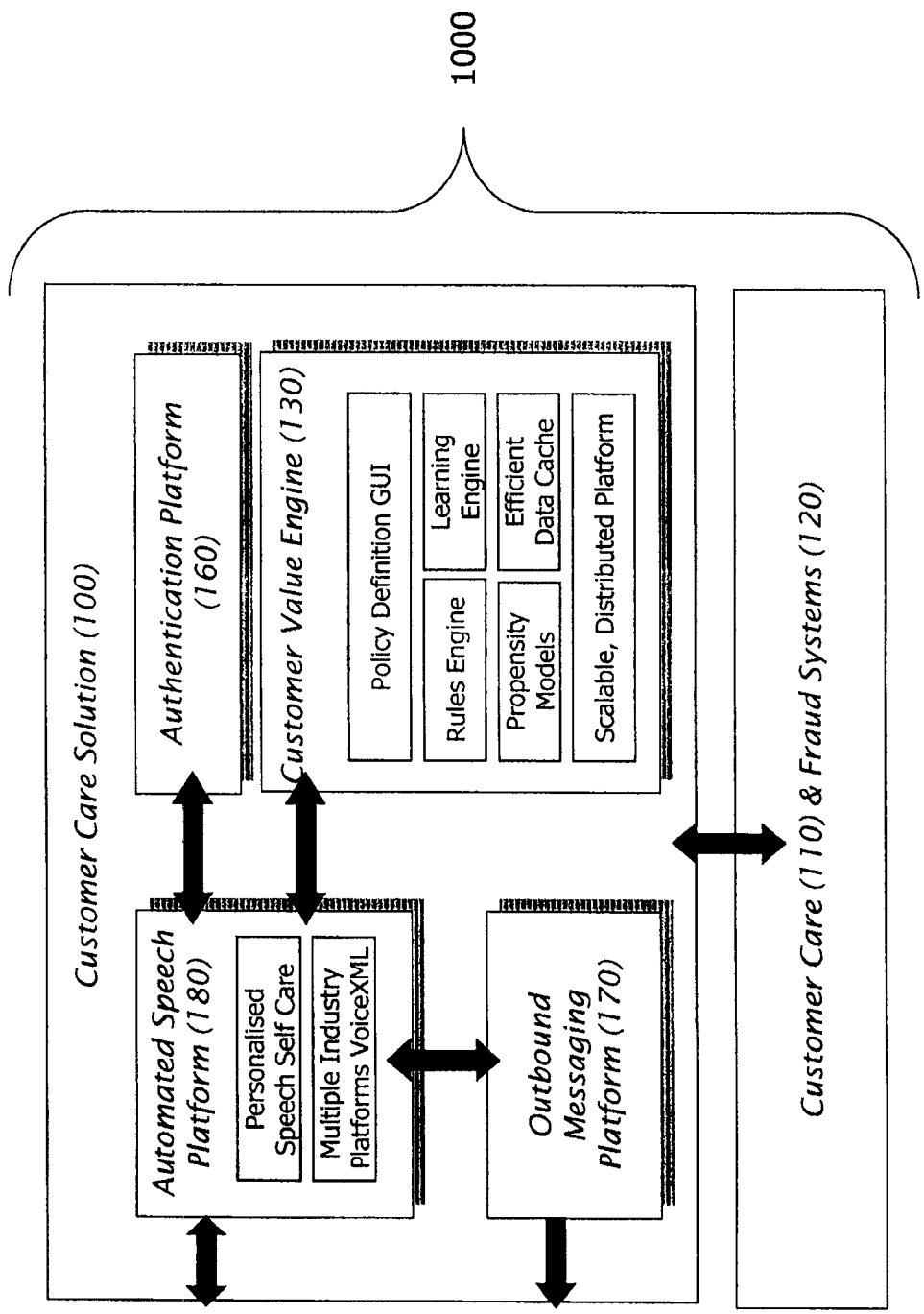
FIG. 1 is a diagram of a system that may be programmed for executing concepts disclosed herein.

FIG. 1 shows a diagram of a system (1000) that may be used with the various concepts disclosed herein. In an embodiment as depicted in FIG. 1, information from a customer care system (110), might be integrated with one or more fraud systems (120). In such an integration, information from the customer care system (110) may be used as inputs to the one or more fraud detection systems (120). These inputs may be directly or indirectly used as indicators of fraudulent activity as discussed in greater detail below.

A customer care system (110) of FIG. 1 may be a self-care system (SCS) or an assisted care system (ACS) or a combination care system with both SCS and ACS components. Such customer care systems (110) may operate to execute both financial and non-financial transactions on behalf of the customer. An example of a financial transaction in such a system would be a transfer of funds, while an example of a non-financial transaction would be a profile update for a change of address. SCSs of the type in FIG. 1 may be of varying sophistication. For example, some may use menu options where a caller selects a desired function by pressing a button on the telephone corresponding to options given by the care system recording. More sophisticated SCSs may be equipped with natural language understanding (NLU) or statistical natural language understanding (SNLU). In these SCSs, a computer will process the caller's voice commands to execute the desired action.

In another embodiment, the existing customer care system (110) and the existing fraud system (120) may be integrated into a customer care solution (100). The customer care solution (100) may include a customer value engine (130). An example of such an engine is described in U.S. patent application Ser. No. 11/686,812, entitled System and Method for Customer Value Realization, filed Mar. 15, 2007, the disclosure of which is incorporated herein by reference. It should be understood that customer value engine (130) may be used for a variety of things, including, but not limited to, determining a customer's contact preferences, assessing the value of the customer to the business, or combining information from multiple discrete fraud detection systems (120) and customer care systems (110). Furthermore, as shown in FIG. 1, customer value engine (130) may be associated with various user interfaces, rules engines, learning engines, models, and data caches.

When pieces of information from a customer care system (110) are used as fraud indicators, one embodiment may associate probabilities with each type of indicator to control when a fraud event is triggered. This approach could allow the presence or absence of any one indicator and its risk probability to control when a fraud event is triggered. In other embodiments, a series of indicators and their probabilities may be linked such that a defined threshold must be reached based on the total risk assessment before a fraud event is triggered. This approach could allow the presence or absence of several indicators and their associated risk probabilities to control when a fraud event is triggered. In some embodiments computer programming using artificial intelligence (AI) technology may be used to automate such decisions by computer. As further embodiments are discussed below, it should be understood that any and all indicators may work individually to trigger a fraud event, or the indicators may work with one or more other indicators to compile an overall fraud assessment before a fraud event is triggered. Furthermore, the indicators may also operate where groups of indicators are used to define a risk, and such aggregated risks are then weighted together to determine the overall risk. In yet another embodiment, the indicators may operate in a cascade, where one indication must be met before any other indicators will be considered.

I. Access Channel

Numerous types of information contained within customer care systems (110) may be used to establish the various fraud indicators to increase fraud detection sensitivity. One such indicator may be the access channel used by the customer. For instance, current fraud engines may track the number and type of care operations typically accessing or changing an account, but not track the patterns of customer care access channels used to conduct these care operations. In an improved system (1000) of the type in FIG. 1, the customer's pattern of using various customer care channels may be tracked, analyzed, and input as an indicator in the fraud detection system (120). By way of example, a fraud event may be triggered when a customer's account shows a history of customer care by direct agent-care via the ACS, but suddenly there is an increase in frequency of web or voice self-care. Also, by way of example, a shift in self-care channels, e.g. from web to voice channels, may trigger a fraud event.

2. Time of Access

Other embodiments, where information from a customer care system (110) might be integrated with a fraud detection system (120), might also track the time of day customer care is accessed. This information could be analyzed and input as a fraud indicator in a fraud detection system (120) of they type shown in FIG. 1. For example, if a customer's account shows that the customer habitually accesses customer care during the same timeframe, then a change in the timing of access may trigger a fraud event, or be incorporated into an overall risk assessment decision based on probability statistics.

3. Patterns of Failed Authentication

Other embodiments of a system as shown in FIG. 1 might include indicators of the customer care system (110) based upon patterns of failed authentication attempts. Certain embodiments may include not only the frequency of failed authentication attempts, but also the details of the failed attempts—more particularly, the context of the failed attempts (including both the reason for the failure and the channel). By way of example, a customer's account may show a frequent failed authentication attempt using the same incorrect string of characters. This may be common where a customer, who maintains different passwords for different accounts, mistakenly and frequently enters the password for account 'X' when trying to access account 'Y.' Later, failed authentication attempts with other unfamiliar character strings may trigger a fraud event which requires additional authorization steps.

4. Indicators Pertaining to Direct Agent-Care

Other embodiments may focus on the customer care channels associated with direct agent-care to detect possible instances of fraud by the agent, or fraud where the agent is working in collusion with the user of the customer care system (110). For example, some embodiments may use the telephone number dialed, or email address used, to reach the agent as an indicator. Fraud may exist where the agent was reached by a direct dial number, or a number other than the published customer care number. Similarly, fraud may exist where the agent was reached by a direct email address instead of a general customer care email address. In such scenarios, the agent may be acting as a "sleeper agent" to perpetrate the fraud, with an external partner contacting them directly with fraudulent customer details.

In yet other embodiments related to direct agent-care, fraud detection indicators may be based on the number of agents that access a particular account. For instance, access to an account by a relatively small number of agents may suggest one or more agents assisting in perpetrating a fraud. Similarly, a fraud indicator may be based on patterns of inter-agent transfers in assisting users. Also, tracking access to dormant accounts might be another fraud indicator. For example, an agent's access of an otherwise dormant account may suggest the agent is committing fraud. Still yet, accessing two unrelated accounts during the same call may be an indicator of fraud. Here the agent appears to be on call serving customer 'A' but is fraudulently accessing account of customer 'B.' Additionally, patterns of account adjustments by agents across multiple accounts may be an indicator of fraud. For example, if an agent consistently credited the same accounts a small amount each month, the agent may be colluding with the account holders to perpetrate a fraud.

5. Navigation of Customer Care Systems

Another embodiment of a fraud indicator that might be seen in a system (1000) as shown in FIG. 1 relates to the speed and ease of the user's navigation of the customer care system (110) and its menus. By way of example and not limitation, in a SCS, fraud may be afoot when the caller uses keypad sequences to navigate multiple menu steps before hearing the recorded prompts. Thus the speed and ease of navigation in customer care systems (110) may be an indicator for fraud detection systems (120).

6. Call Origination

Call origination tracking is another example of a fraud indicator for fraud detection systems (120) that may be within a system (1000) shown in FIG. 1. In such a system, a holistic view of a user's calling patterns may be integrated as a fraud indicator. The holistic view may be achieved by pooling calling data from both live agent-care and self-care. Furthermore, the calling view may be enhanced by using third party databases and number patterns to identify mobile numbers in a user's calling pattern. Fraud events would be triggered where, for example, a single mobile number or single land-line number is used to call either live customer care or self customer care for a number of unrelated customer accounts. Similarly, fraud events would be triggered, or at least fraud sensitivity increased, where the calling number is withheld when using telephone services. A further enhancement for identifying potentially fraudulent calling numbers may be by sharing the call origination tracking data across call-centers for multiple financial organizations, subject to national privacy regulations.

Other embodiments of a fraud indicator based upon originating information may pertain to the customer's designation of numbers for making a transaction through customer care channels. Where the customer has designated such numbers to use when calling customer care channels, fraud may be present when a user attempts to access the customer's account with a non-designated number. Alternatively the system may request additional authentication when a non-registered channel is used, or limit the user to 'enquiry only' operations from non-registered numbers.

7. Location Information

In other embodiments of fraud detection systems (120) that may be within a system (1000) shown in FIG. 1, location information may be used as a form of a fraud indicator. This location information may be provided explicitly from the customer via a care channel, or automatically via location detection means that may include location based on network signals, E911 location technologies, or even GPS location technologies. In one embodiment, a customer's travel information could be integrated into a fraud detection system (120), such that the fraud model can respond accordingly. As an example, in response to a customer's two-week travel plans from the United States to the United Kingdom, the fraud model could lower risks attributed to UK card-present transactions, raise risks for certain types of card-not-present transactions, and query or reject transactions presented as card-present transactions in the home country.

Still another embodiment of an indicator may include associating location information from a POS terminal and mobile device. For example, when a customer uses a POS terminal, the customer's location could be confirmed by referencing the location of the POS terminal against the location of the customer's mobile device. Where this referencing did not produce matching locations, a fraud event may be triggered. Note in the above and elsewhere, it may not be that a mismatch in location triggers a fraud event, but rather that the default sensitivity of the fraud engine is raised. Note that such monitoring may typically require the user to 'opt-in' to such monitoring.

In other embodiments, where there is a card-not-present transaction, the location of the customer's mobile device may be used to validate the customer's presence. In examples of this type, the customer's mobile device may show the customer's location to match the location of the card-not-present transaction. In other circumstances, e.g. online purchases, the customer's presence in his home location may provide some degree of authenticating information for an internet based card-not-present transaction.

8. Stealth Information

In other embodiments, fraud indicators may be based on stealth information. Such stealth information may be incorporated with both self and assisted customer care systems. Biometric information can be considered one type of particularly useful stealth information. In one embodiment, a customer care system may be equipped to detect certain biometrics without the customer's knowledge. More particularly, voice analysis techniques could be used to identify a particular voice, assess stress of the speaker, or assess other emotional characteristics of the speaker. A fraud event could be triggered when such biometric information fails to match established patterns for the customer's account. Additionally, menu traversal may be considered another form of biometric-based stealth information. As discussed above, menu traversal should be understood to refer to the manner in which a menu system is accessed. The manner of menu traversal may encompass the specific steps used, the sequence of navigation, and the speed of navigation, among others.

Another embodiment related to stealth information may pertain to ACSs where the agent assesses the transaction's content, context, and the user's characteristics to determine if the transaction meets a threshold of suspicion for fraud. For example, call-center agents may often feel that a recent customer transaction or query they handled was suspicious. For example, the agent's suspicion could be based on the circumstances of a call, a caller's unique requests, a caller's tone, the transaction details, or any information about the transaction or interaction which may create suspicion in the mind of the agent. In such cases a caution trigger may be associated with such agent reactions. The association of the caution trigger may be conducted by a myriad of ways. One such method may be to allow the agents to mark suspicious transactions via a "caution" button. This may include means for inputting a Boolean value, a graduated level value and/or a percentage value. This act of marking suspicious transactions may then serve as a fraud indicator. The response to a fraud event triggered in this manner may be to alert a sensitivity to a customer, e.g. by issuing a confirmatory communication and requiring a response if necessary. In some embodiments, the agent may be able to confirm a suspicion by viewing the customer's recent transactions and queries over other channels in the customer care system (110). Still in other embodiments, the cautionary trigger information may be input into the system's (1000) learning engine to aid in identifying further patterns of fraud based on agent suspicion levels. For example, allowing the agent to enter a 'human intuition' factor may be particularly valuable for insurance claim fraud detection, where the customers themselves are actually perpetrating the fraud.

The above discussed indicators are not exhaustive of all possible indicator types that may be used in a system described in the embodiments. Instead, these described indicators represent some of the indicator types that may be useful in improving fraud detection. It should be understood that those indicators discussed herein shall be understood to include obvious variations that those of ordinary skill in the art will appreciate.

B. System and Method for Fraud Resolution & Fraud Model Modification

While the indicators of fraud discussed above are important aspects in improving fraud detection, such indicators are merely inputs to a well designed system capable of executing a method to effectively use such inputs to improve fraud detection. The following paragraphs will describe in further detail embodiments of a system and method that may use the indicators discussed above as well as other indicators not discussed.

A useful feature of a well designed fraud detection system includes an effective means of communicating with customers when a fraud event is suspected. At present, various infrastructures exist for secure communication with customers. Examples of such infrastructures include interactive voice response (IVR) with multi-factor authentication, and secure communication clients loaded onto mobile phones using a combination of encrypted short messaging system (SMS) and IP communication. Communications may originate from such infrastructures either manually or automatically.

Leveraging these types of communication infrastructures, additional embodiments may comprise a feedback system where secure communications may provide authenticating information and/or additional information that may be input into the fraud models. Once the fraud models receive such information, the models may be updated accordingly to provide better sensitivity to patterns of fraud. Such updates may occur manually or automatically. As shown in FIG. 1, outbound messaging platform (170), automated speech platform (180), authentication platform (160), and customer value engine (130) may be configured to accomplish such a communication and feedback approach that works with customer care (110) and fraud systems (120).

Figure 2:
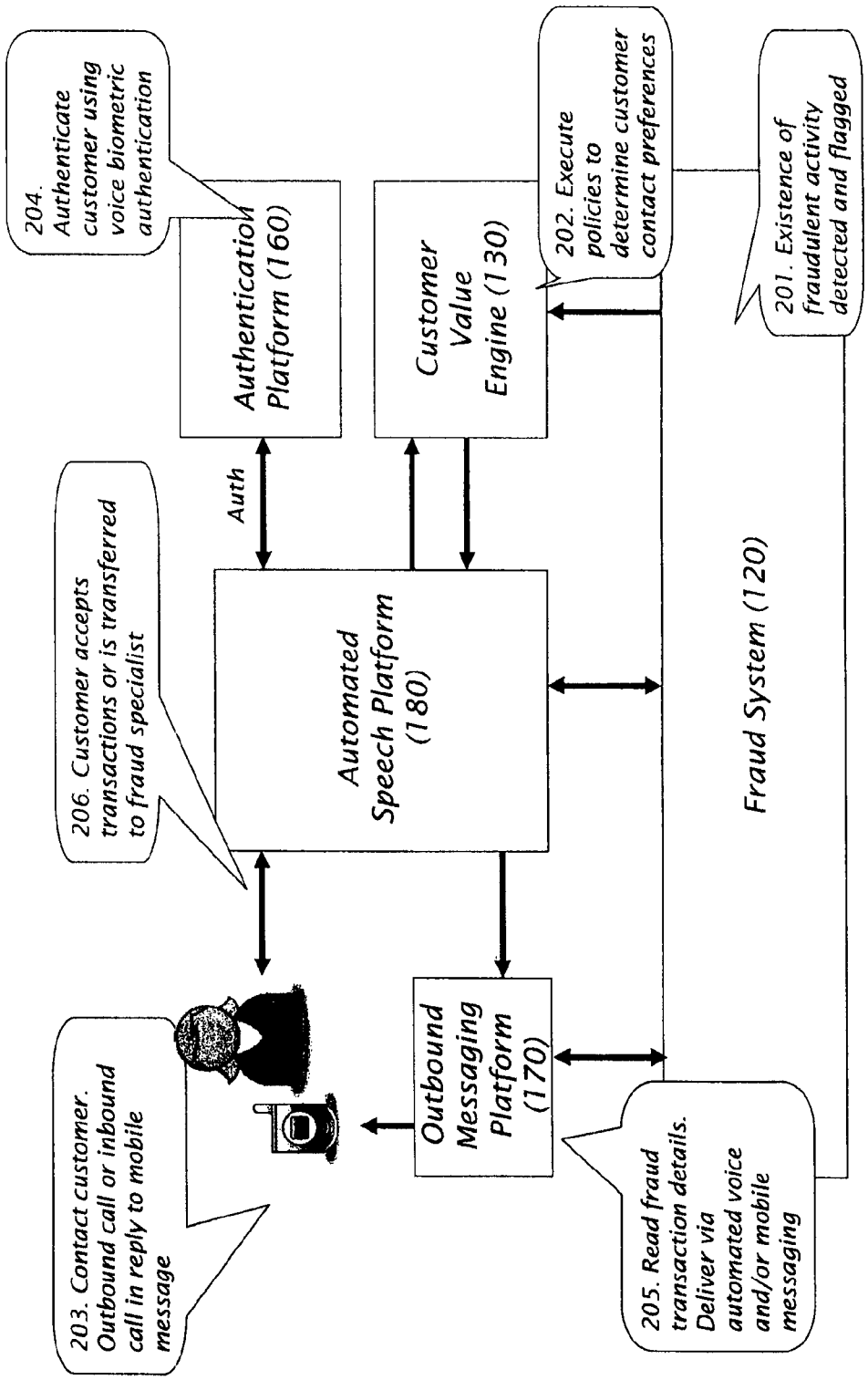
FIG. 2 is a diagram showing a fraudulent transaction verification and notification.

In certain embodiments of the diagram seen in FIG. 2, one or more of fraud monitor systems (120) would notice the customer making transactions outside a normal pattern (201). In identifying deviations from such patterns, fraud systems (120) may include traditional indicators only, indicators as discussed above, or a combination of indicators. Once a deviation is identified (201), the fraud system (120) may suggest a plausible reason for the deviation, e.g. customer travel due to vacation or relocating. This plausible reason may be known as the assertion of the fraud system (120). Once the assertion is determined, the fraud system (120) may then leverage knowledge about the customer's available communication modes and preferences (202). Such modes and preferences may be part of a customer value engine (130) that works with the fraud system (120).

After creating the assertion, the customer may then be notified, by either manual or automatic means, and given an opportunity to confirm or deny the assertion (203). In embodiments of this system and method, notifying the customer (203) and acquiring the customer's response may occur over the same or different channels of communication. By way of example, the fraud system may automatically send a secure message to the customer's mobile phone and request that the customer call the IVR.

After the customer notification step (203), a customer authentication step (204) may be used when the customer responds to the notification. In an embodiment where the customer calls into an IVR, the IVR may use voiceprint identification to confirm the customer's identity (204). In another example of authentication, the customer may have secure messaging ability where the message may contain an authenticating question that the customer can respond to on the secure messaging device. Where secure messaging is implemented on a mobile or personal computer, the messaging system will typically incorporate an authentication process associated with the user responding to the assertion. While simple passwords might be used, technologies based around grid/pattern matching, or even voice authentication in parallel with secure messaging may be used (e.g. a user provides feedback on an application/web page via a mobile phone, then a central system calls the user for voiceprint authentication of the recent operation). Still other examples of notifying and authenticating the customer may include calling the customer directly via a live agent, or immediately directing the customer to a fraud specialist at their next system login. Once the customer is reached, the fraud specialist may authenticate the customer by asking for answers to preselected questions the customer has previously chosen.

Once the customer has been notified and authenticated, the details of the suspected fraudulent activity can be relayed to the customer (205). Relaying this information may be accomplished manually, e.g. by a live agent, or automatically, e.g. by an IVR system (205). The customer's response to the notification and relayed information provides the customer with an opportunity to authenticate the suspected fraudulent activity (206).

From this point, the fraud models used by the fraud system (120) may be updated and the fraud system may alter its detection rules based on the updated information. Such updates and modifications to the fraud models and rules may be accomplished manually or automatically. These fraud model updating aspects are discussed in more detail below with respect to FIG. 3.

Figure 3:
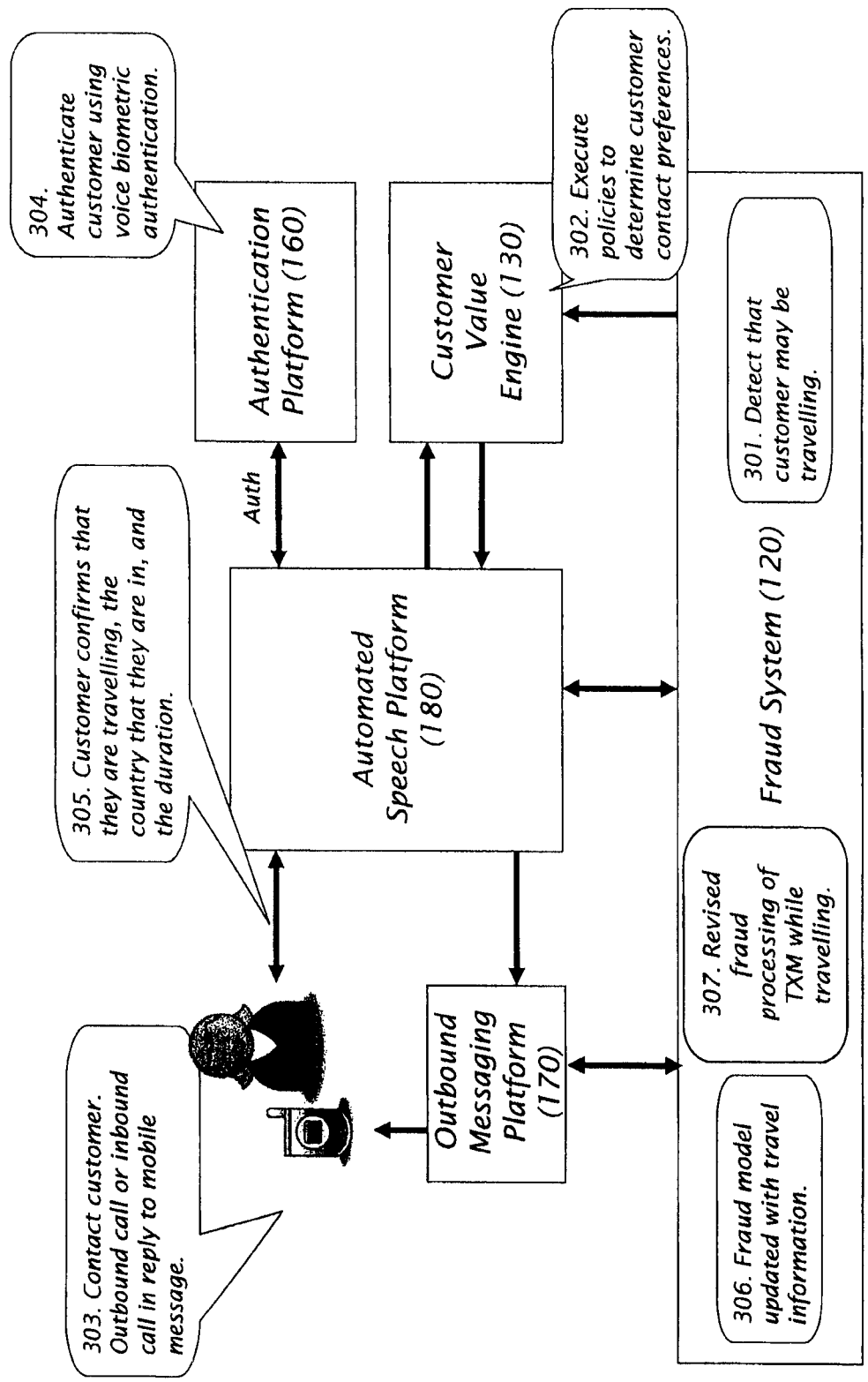
FIG. 3 is a diagram showing taking note of a customer's travel schedule.

Now referring to FIG. 3, the fraud detection model may be modified based on the customer's response to the notification and relayed information (306). While FIG. 3 relates to an example where the customer is traveling, it should be appreciated that the fraud detection model may be modified based on any pertinent information provided by the customer.

Referring to FIG. 3 specifically, at (301) the fraud system (120) detects that the customer may be travelling and generates a corresponding assertion. Using the customer value engine (130), the customer's contact preferences are determined and then at (303) the customer is contacted. When the customer responds, there is an initial authentication step, possibly by voice analysis as seen in FIGS. 2 and 3 (204) (304). After successful authentication (304), the customer confirms his traveling status, and optionally may include the timeframe and destinations of his travels (305). The fraud models of the fraud system (120) may then be updated accordingly (306). The updated fraud system (120) may then modify the fraud detection rules based on this updated information (307). An example of such a modification may be to reject as fraudulent, transactions via ATM/POS terminals in the customer's home country since the customer has confirmed that he is abroad. At the same time, the fraud model may now update itself to lower the risk assessment for transactions in the visiting country for the duration of the customer's trip. Where the customer is contacted and the customer does not confirm the assertion of the fraud system, then additional steps would be taken to verify whether the transactions are valid. This may involve connecting the user to a fraud specialist as shown in FIG. 2 at (206). Furthermore, while this verification is in progress, the fraud sensitivity may be raised on additional out-of-country transactions.

In another embodiment of the system and method of fraud resolution and fraud model modification, the customer may have the ability to send updates to the fraud system before a notification is received by the customer. For example, the customer may be able to inform the fraud model of upcoming travel plans and the fraud model may then automatically modify rules for detecting fraud based on this information. Note that explicit notification of future travel may, of itself, prime the fraud sensitivity. For example, if such explicit notification has never been used before it might indicate a user of a stolen card trying to desensitize the system before making fraudulent transactions in another country.

Still in other embodiments of the fraud system and method, the system may make assertions of various types. By way of example and not limitation, a purchase on a customer account against a site known for fraud may trigger an assertion that the customer's payment information has been compromised. In another example, a purchase or series of purchases that are not typical for a customer's account may raise an assertion by the fraud system of a new spending pattern by a family member. With respect to the vast number of assertions that may be made, each may be followed by verification steps, acquisition of supplemental information during verification, and fraud model modifications to improve the sensitivity of the fraud detection system.

Assertions from fraud engines of the type herein are typically generated by computer programs that use AI technologies such as Bayesian or Neural networks. Such AI technologies allow the fraud engines to be configured or trained to identify certain transaction patterns. When the transaction characteristics are present and the risk associated with such characteristics indicate fraud based on the computer programming thresholds, the fraud engine will generate the assertion.

By way of simplified example, to determine if the customer is traveling and generate the assertion for later verification purposes, the fraud engine would typically look for one or more transaction characteristics from one or more recent transactions. Such transaction characteristics may be determined from information normally present in the electronic transaction details. Examples of transaction characteristics that a fraud engine may use to generate a traveling assertion include: the charge being presented via a credit card network outside the users home country, the charge not being in the home currency of the user, the charge being presented via a physical card terminal, and the charge being marked with address or location information of the POS terminal.

The above discussed features of a system and method of fraud detection are not exhaustive of all possible features that may be used in such systems or methods as described in the embodiments. Instead, these described features represent some of the features that may be useful in improving fraud detection. It should be understood that the features discussed herein shall be understood to include variations that those of ordinary skill in the art will appreciate. Furthermore, it should be appreciated that the features of a fraud detection system and method, as discussed above, may be embodied in one or more computer-readable data storages having computer-executable instructions.

C. Debt Models

While the present disclosure's focus is on fraud detection, it should be appreciated that such feedback and learning techniques disclosed herein can also be applied to debt models. Debit systems may include systems where indebted customers (debtors) may have become delinquent on their payments and current creditors may have been unsuccessful in locating and/or contacting these customers. For example indebted customers may be marked by existing debt systems as 'skipped' in some circumstances where the customer's location or accessibility is indeterminate. Similarly, a customer may be marked as skipped when personal details, such as residential phone number, may have been lost because of a recent relocation. Absence of account customer details is a known indicator for poor debt recovery. When such absences of information exist, automation can be used to try and contact the customer via multiple channels and recover information to update an indebted customer's profile. Such a technique would increase the chance of debt recovery and reduce the cost of updating customer profiles when information becomes absent.

The above paragraphs are meant to provide an enabling disclosure to those skilled in the art. The descriptions are not intended to be limiting or exhaustive in any sense. The full scope of the invention is detailed in the claims that follow.

What is claimed is:

1. A non-transitory computer-readable medium including computer-executable instructions to perform method steps comprising:
    storing indicators for identifying fraudulent events related to a customer account, the indicators indicative of environmental information associated with fraudulent events when a fraudulent user accesses or interacts with a customer care system via a processor, the customer care system configured to allow access to or modification of the customer account;
    associating a risk probability with each of the indicators;
    defining one or more fraud models based on the indicators, wherein the one or more fraud models describe events indicative of fraudulent activity, wherein the one or more fraud models each includes a defined threshold; and
    determining that an event associated with the customer care system is indicative of fraud, wherein the event is associated with input indicative of environmental information when a user is accessing or interacting with the customer care system via the processor to access or modify the customer account, wherein the step of determining comprises:
        comparing the inputs associated with the event to the one or more fraud models;
        verifying that the event exceeds the defined threshold for similarity between the event and the one or more fraud models based on the comparison of the inputs associated with the event to the one or more fraud models; and
        determining whether a fraud event is triggered based on at least two inputs corresponding to at least two of the indicators and the associated risk probabilities of the indicators;
    wherein the indicators indicative of environmental information include an access channel used when accessing customer care operations in the past compared to the present, time patterns of access when accessing the customer care system in the past compared to the present, a frequency of failed attempts and a context of the failed attempts when accessing the customer care system, a contact number that is a non-designated number used to reach a customer care agent associated with the customer care system, an email address that is not a general customer care email address used to reach a customer care agent at the customer care system, and a number of transfers used to reach a customer care agent at the customer care system.

2. The computer-readable medium of claim 1, wherein the method steps further comprise:
    creating an assertion for the event determined to be indicative of fraud;
    communicating the assertion to an authorized user of the customer account;
    authenticating the authorized user of the customer account;
    receiving a response from the authorized user, wherein the response comprises information revealing the nature of the event; and
    updating the one or more fraud models with the information provided in the response from the authorized user.

3. The computer-readable medium of claim 2, wherein the step of communicating the assertion to an authorized user of the customer account comprises:
    determining the authorized user's preferred mode of contact; and
    initiating a communication to the authorized user in accordance with the preferred mode of contact.

4. The computer-readable medium of claim 1, wherein an input associated with the event comprises a value of a graphical user interface having a field configured to capture the value indicating a level of suspicion associated with the event, and wherein the suspicion is based at least in part on a direct interaction between a human agent and a user attempting access to the customer account.

5. The computer-readable medium of claim 1, wherein defining one or more fraud models further comprises linking the probability associated with each of the indicators for a total risk assessment in order to define a threshold when a fraudulent event is triggered.

6. The computer-readable medium of claim 1, wherein the indicators indicative of environmental information further include a user's speed and ease of navigating a customer care system.

7. The computer-readable medium of claim 1, wherein the indicators indicative of environmental information further include a user's travel information.

8. The computer-readable medium of claim 7, wherein the user's travel information comprises a notification of future travel.

9. The computer-readable medium of claim 1, wherein the indicators indicative of environmental information further include a voice analysis to assess stress or emotional characteristics of a speaker.

10. The computer-readable medium of claim 1, wherein the context of failed attempts comprises entry of a same incorrect string of characters.

11. The computer-readable medium of claim 1, wherein the context of failed attempts comprises entry of an unfamiliar character string.

12. A fraud detection system comprising:
    a first non-transitory computer-readable data storage including a first set of computer-executable instructions that, when executed via a processor, cause storage of indicators associated with a customer account, wherein the indicators comprise environmental information associated with fraudulent events when a fraudulent user accesses or interacts with a customer care system, the customer care system configured to allow access to or modification of the customer account, wherein the indicators indicative of environmental information include an access channel used when accessing customer care operations in the past compared to the present, time patterns of access when accessing the customer care system in the past compared to the present, a frequency of failed attempts and a context of the failed attempts when accessing the customer care system, a contact number that is a non-designated number used to reach a customer care agent associated with the customer care system, an email address that is not a general customer care email address used to reach a customer care agent at the customer care system, and a number of transfers used to reach a customer care agent at the customer care system;
    a second non-transitory computer-readable data storage including a second set of computer-executable instructions that, when executed via the processor, cause association of a risk probability with each of the indicators and further to control whether a fraud event is triggered based on at least two inputs associated with an event corresponding to at least two of the indicators and the associated risk probability of the at least two indicators, the at least two inputs indicative of environmental information when a user is accessing or interacting with the customer care system to access or modify the customer account;

a third non-transitory computer-readable data storage including a third set of computer-executable instructions that, when executed, cause one or more fraud models to be defined, wherein the one or more fraud models are based on a presence or absence of at least two of the indicators that are indicative of fraud;

a fourth non-transitory computer-readable data storage including a fourth set of computer-executable instructions that, when executed, cause a communication link with an authorized user of the customer account to be established;

a fifth non-transitory computer-readable data storage including a fifth set of computer-executable instructions that, when executed, authenticate the authorized user; and a sixth non-transitory computer-readable data storage including a sixth set of computer-executable instructions that, when executed, cause information from the authorized user to be received, through any available channel of communication between said authorized user and the fraud detection system, and update the one or more fraud models with the received information and the inputs associated with the event.

13. The fraud detection system of claim 12, wherein the communication link is established according to the authorized user's contact preferences, wherein the authorized user's contact preferences are stored in a computer-readable data storage selected from the group consisting of:

the first computer-readable data storage, the second computer-readable data storage, the third computer-readable data storage, and combinations thereof.

14. The fraud detection system of claim 12, wherein the first computer-readable data storage comprises a set of variables that serve as indicators for identifying the event as indicative of fraud, and further wherein at least one indicator is set by an agent based on the agent's suspicion that the event is fraudulent.

* * * * *